Aug. 23, 1932.　　　　　L. WEBER　　　　　1,873,167
PROCESS OF AND APPARATUS FOR DRYING HOPS AND/OR
EXTRACTING OILS AND RESINS THEREFROM
Filed Oct. 24, 1928　　　2 Sheets-Sheet 1

L. Weber
INVENTOR

By: Marks & Clar
ATTys.

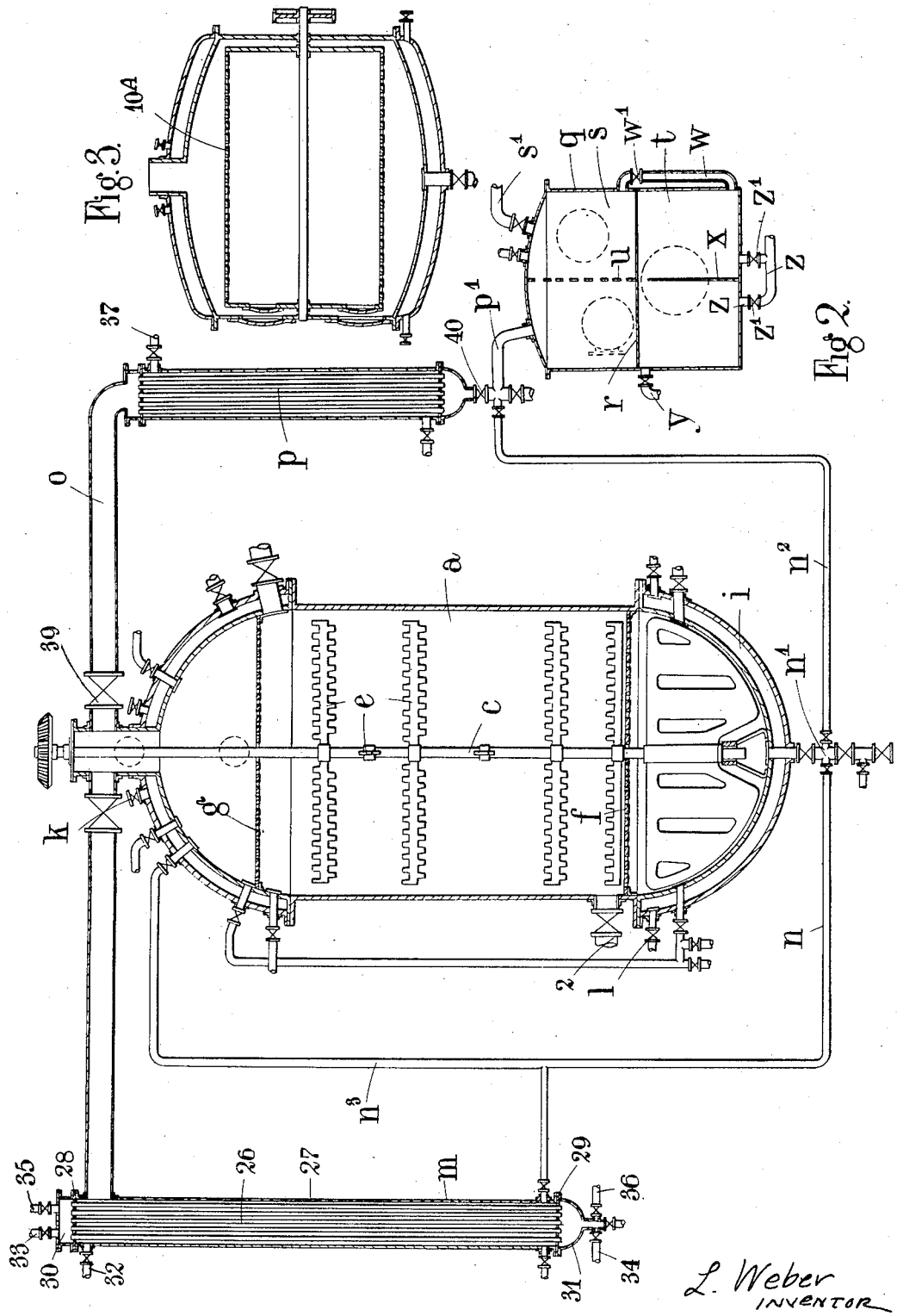

Patented Aug. 23, 1932

1,873,167

UNITED STATES PATENT OFFICE

LOUIS WEBER, OF LANGLEY, ENGLAND

PROCESS OF AND APPARATUS FOR DRYING HOPS AND/OR EXTRACTING OILS AND RESINS THEREFROM

Application filed October 24, 1928, Serial No. 314,745, and in Great Britain October 27, 1927.

This invention relates to a process and apparatus for drying hops and/or extracting oils and resins therefrom.

One object of the invention is to provide an improved process and apparatus for drying green hops to prepare them for the market.

A further object is to provide a process and apparatus for drying green hops whereby oil and other extractives, which may be removed during the drying, can be recovered as a by-product which may be used in the manufacture and flavouring of beverages in the brewing art.

A still further object of the invention is to provide a process and apparatus which may be employed in the treatment of dried hops or green hops to recover the oil, soft and hard resins and tannin and other extractives therefrom, which products may be used in the manufacture, flavouring and preserving of beverages in the brewing art.

As is well known, green hops after picking from the plants are subjected to a drying process before being used in brewing processes. Such drying is usually carried out by subjecting the hops to a heated atmosphere on drying floors, a proportion of the oil, lupulin powder and other valuable products which are removed from the hops during the process being lost or converted. Further the excessive heat to which the green hops are subjected in the above process is deleterious to the hops inasmuch as the heat has a tendency to cause oxidation of the oils and to spoil or harden a portion of the soft resins.

An important feature of the present invention consists in drying hops by subjecting them to a current of warmed air, preferably at a temperature of the order of from 70° to 90° F. or alcoholized air. The process is preferably carried out at a reduced pressure which may be subatmospheric pressure. The hops are preferably subjected to the treatment in a still or other vessel whilst being agitated in order to prevent compacting of the hops locally and consequent short-circuiting of the current of air or alcoholized air through the looser portions of the mass, whereby even treatment of the latter will result. Further, the warm air or alcoholized air, after passing through the mass of hops is preferably passed through a condenser to liquefy, and thus separate for recovery, any oils which are carried over with the air from the hops.

As will be appreciated the temperature of the air for treating the hops is a comparatively low temperature, and such as will not cause oxidation to occur. Furthermore, the air is preferably in a dry state and may be dried in any suitable manner previous to passing through the hops.

According to a further feature of the invention green or dried hops may be treated to more or less completely remove oil, soft resins, hard resins, tannin and other valuable constituents from the hops. In the case of green hops they are first dried, and this is preferably carried out according to the manner previously set out, but if desired, hops which have been kiln-dried according to known processes may be similarly treated.

A further feature of the invention, therefore, consists in extracting oils and resins from hops by treating dried hops by passing a current of water vapour through the hops and treating the vapour to separate out the oils carried over with the vapour.

Subsequent to this treatment a current of warm air or alcoholized air is preferably passed through the hops and the air or alcoholized air is then treated to remove moisture and oils carried over with it in order to recover the remaining oil and to dry the hops ready for subsequent processing.

The hops are preferably further treated with strong alcohol which is circulated through them to dissolve out the soft resins, and as much of the hard resins as are soluble therein, it being understood that the said resins are subsequently separated from the alcohol and the alcohol rectified if desired for further use. The alcohol remaining in the hops may be recovered by passing warm air through the mass, the alcohol vapours being liquefied in a condenser and collected in a receiver for re-use. This is also carried out under reduced pressure. When all the alcohol has been recovered the hops are then further treated with warm water which is circulated through them to dissolve out the remainder of soft and hard resins, tannin and all that may be soluble in warm water. The resins and tannin are subsequently separated from the water. The spent hops are then emptied out ready for recharge of the still. By circulation of the water or strong alcohol the quantity used can be reduced to a minimum, which is an important item to be considered in economy of manufacture, particularly in the case of alcohol.

I will now proceed specifically to describe my process in connection with suitable apparatus according to the invention and illustrated in the accompanying drawings in which:—

Figure 2 is a diagrammatic sectional elevation of an apparatus for drying hops; and Figure 3 is a sectional elevation of a modified form of still.

Figure 1:
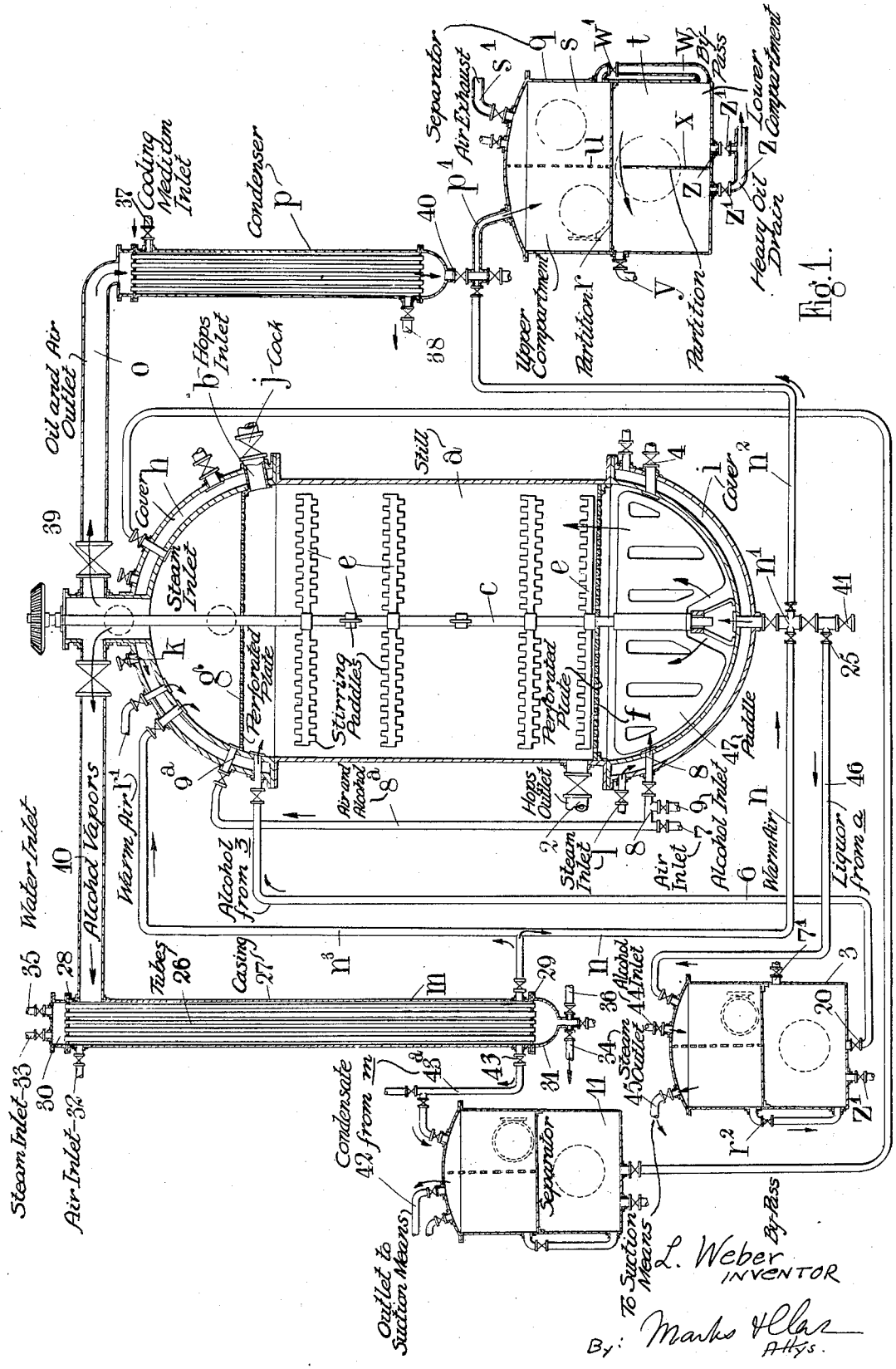
Figure 1 is a diagrammatic sectional elevation of an apparatus both for drying hops and extracting the oils and resins therefrom.

Describing first the drying of hops, green hops are placed in a vertical cylindrical still $a$ through an inlet $b$ until the still is full, or they may be conveyed into the still by any suitable means. It is preferred, however, to draw them in through the inlet $b$ by creating a vacuum in the still as this will involve less handling of the hops which often results in damage thereto. Further, the hops can be drawn into the still without handling them, immediately after they have been picked, which is important inasmuch as green hops deteriorate very rapidly.

Stirring means is provided in the still, which stirring means may consist of a vertical shaft $c$ mounted in suitable bearings and carrying a series of radially extending blades, paddles or rakes $e$. The shaft $c$ is rotated during the filling of the still with the hops and the rakes level the hops out and distribute them evenly throughout the space between a false bottom $f$, which may merely consist of a perforated plate, as shown, or may have its upper surface covered with a fine gauze cloth to prevent lupulin powder falling through, and a perforated plate $g$ in the upper portion of the still, which plates serve to confine the hops between top and bottom dome-shaped jacketed covers $h$ and $i$. With the hop inlet $b$ closed as by a cock $j$, and the stirring gear rotating, steam is passed into the jackets $h$ and $i$ of the top and bottom covers by way of the respective inlets $k$ and $l$, and warm air at a temperature from 70° to 90° F. from a suitable air heater $m$, passes into the still by way of pipes $n$ and $n^1$ the latter extending through the bottom cover, so as to discharge into the interior of the still below the false bottom $f$, and the air passes upwardly through the hops and out of the still by way of an outlet $o$ extending through the top cover, the air being drawn through the still by suction exerted on a condenser $p$ which receives the air, laden with any oil or vapour it has collected during passage through the hops in the still. The oil condenses in the condenser $p$ and passes to a closed receiver or separator $q$ by way of a pipe $p^1$. The air heater $m$ comprises a series of tubes 26 arranged within a casing 27 and having their ends projecting through and sealed in end plates 28 and 29 to which are respectively secured top and bottom headers 30 and 31. A valve controlled pipe 32 is connected to the casing 27 for supplying the air to be warmed for the treatment of the hops. An inlet pipe 33 is connected to the top header for the supply of steam or other heated fluid medium for warming the air and an outlet 34 for the steam or other heated fluid medium is connected to the bottom header. The steam inlet and outlet pipes are each provided with a cock whereby the flow through the tubes can be controlled, and the inlet and outlet for the air are also each provided with a cock whereby the air, which flows through the casing around the tubes can also be controlled. The top and bottom headers are also respectively provided with valved water inlet and outlet connections 35, 36, for a purpose hereinafter described but which are closed when the apparatus is being used for drying hops. The condenser $p$ is similar in construction to the air heater except that the casing is provided with inlet and outlet connections 37 and 38 for the supply to and discharge from the casing of a cooling medium, for example cold water to cool the air or alcoholized air and so condense oil or oil and alcohol therefrom during flow through the tubes $p$, it being understood that the outlet $o$ of the still is connected to the top header of the condenser while the bottom header is converted into a receiver $q$, suitable cocks 39 and 40 being provided in these connections.

The receiver $q$ preferably comprises a vessel divided by a wall $r$ into upper and lower compartments $s$ and $t$, the upper compartment $s$ being divided by a vertical perforated strainer plate or the like $u$, and the oil and air or oil and alcoholized air pass into the receiver by way of the pipe $p^1$ on one side of the perforated plate, the condensed oil falling by gravity to the bottom of the compartment $s$, whilst the air will be withdrawn through the pipe $s^1$ by an exhaust vacuum pump as hereinafter referred to. The compartment $t$ preferably has a vertical partition $x$ extending from its bottom wall to within a short distance of the division wall $r$.

Connecting the lower portion of the compartment $s$ to the lower portion of the compartment $t$ is a by-pass pipe $w$ having a valve or cock $w^1$ whereby when the compartment $s$ has become filled or substantially filled with condensate the latter may be allowed to flow by gravity to the compartment $t$ on the cock $w^1$ being opened. The heavier oil will settle at the bottom of the compartment $t$ and when the oil has risen above the partition $x$ the lighter oil will flow over the top of the partition $x$ into the other side of the compartment $t$ where it may undergo further stratification. When the compartment $t$ has become filled or substantially filled with oil the lighter oil at the upper portion of the compartment $t$ may be removed from time to time by opening a valve or cock $y$ arranged in a draw-off connection at the upper portion of the compartment $t$ but located at the opposite side to the by-pass $w$. As an alternative to this mode of using the separator or receiver, the cock $w^1$ may be left open until oil has risen above the by-pass. The by-pass cock $w^1$ is then closed and the lighter oil can be drawn off by opening the cock $y$. Outlets $z$ are also provided in the lower part of the compartment $t$ whereby heavier oil and other extractives which remain below the upper edge of the partition can be drawn off by way of valves $z^1$, and these extractives can, if desired, be led to a separator for removing the hop oil from other constituents. The outlet of the condenser $p$ is connected to one side of the upper compartment $s$ of the receiver, and the other side of the said compartment $s$ has connected to it a pipe $s^1$ which is connected to any suitable suction-creating means such as an exhaust or vacuum pump which acts to create the suction through the still $a$ and the condenser $p$ which suction is maintained throughout the drying process. As will be understood the suction also serves to draw the air into and through the air heater $m$ before passing to the still, and to withdraw the spent air from the receiver.

When the drying process is complete the dried hops are removed from the still, preferably by suction, through the outlet 2, and baled ready for the market. During the drying process the stirring gear $c$, $e$ is maintained in motion at a slow speed, so as to secure efficient and even drying of the hops. The stirring or agitation of the hops ensures every part of the mass in the still being dried and avoids short-circuiting of the air through looser parts of the mass, whereby the more compacted parts would remain wet, which would result in the greater proportion of the soft resins being spoilt or hardened. The lupulin powder which collects on the false bottom will also be treated by the warm air or alcoholized air at the same time. The suction or reduced pressure facilitates the release of the moisture and thus enables the hops to be dried rapidly at a temperature such as will not cause hardening of the soft resins or otherwise injure the valuable constituents of the hops.

If desired, the drying process may be carried out by passing the warm air or alcoholized air into the still at the top, by way of the branch connection $n^3$ so that the air passes downwardly through the hops. In this manner the warm air of alcoholized air, in passing through the still, causes a certain degree of compression of the mass of hops to aid in removing the moisture and oils therefrom. When the apparatus is used in this manner, however, the lower jacket $i$ may have circulated through it a cooling medium whereby any oil vapour carried by the air or alcoholized air will condense in the lower dome-shaped cover, from whence it may be removed. The oil laden air and alcoholized air may, however, be allowed to pass into the separator or receiver $q$ by way of pipes $n^1$, $n^2$ and $p^1$ where the condensed oil will be separated from the air as heretofore described.

In carrying out the further part of the process for extracting the oil, hard and soft resins, tannin and other valuable constituents from hops, the latter if in the green state are first dried, preferably in the manner, and by the use of the apparatus illustrated in Fig. 1, in the manner above described. If the hops are already dry, however, the extraction process as described hereafter may begin immediately on placing them in the still.

According to the extraction process, water is first run into the dome-shaped bottom cover of the still through a water inlet 4 up to within a short distance of the perforated false bottom $f$. The jackets $h$ and $i$ of the top and bottom covers are supplied with steam or other heating medium and suction is created through the condenser $p$ and still as before described. The reduced pressure below atmospheric will, together with the heating of the jackets $h$ and $i$, cause the water in the bottom of the still to be converted into water vapour, which will be drawn through the hops and carry with it the oil, and the vapours will be condensed in the condenser $p$ and then pass to the receiver $q$. The condensed oil in this case will be mixed with water or condensed water vapour but the oil and water will stratify in the lower compartment $t$ of the receiver $q$ and the oil can be removed from the upper part of the lower compartment. When the passing of water vapour through the hops fails to yield any more oil the water is run out from the bottom of the still and alcoholized air or warm air is drawn through the apparatus and passes downwardly or upwardly through the still, the oil-laden air or alcoholized air in the case of upward flow passing through the condenser $p$ from the still to the receiver $q$ where the oil is condensed as previously described, or in the case of downward flow the oil, or oil and alcohol, condense in the dome-shaped bottom cover of the still and may be removed or allowed to pass to the receiver $q$ by way of pipes $n^1$, $n^2$ and $p^1$ as hereinbefore described. Alcoholized air may be supplied by means of a jet pipe 8 by supplying air under pressure by way of a valved branch 7, and alcohol by way of a valved branch 9. If desired, a plurality of jet pipes may be employed. In each case the oil subsequent to condensation passes to the receiver $q$.

When the hops have been completely dried by the air or alcoholized air, strong alcohol i. e. 96% or more, as near absolute as possible, is circulated through the hops to dissolve therefrom the soft resins. The alcohol employed is as strong as possible as the stronger the alcohol the less hard resins are dissolved out thereby. When no more extracts can be obtained in this manner the outlet of the still is closed so that all the alcoholic solution can be drawn in and allowed to collect in the still, steam or warm water is then passed through the top and bottom jackets of the dome-shaped covers of the still and the solution reduced down to the required consistency and the liquor run off. The alcoholic vapours which pass out by way of the pipe 10 therefrom are condensed in the air heater $m$ which is now used as a condenser, and the condensate collected in a receiver or separator 11, which is similar to the receiver $q$ hereinbefore described. This part of the process is carried out under as high a vacuum as possible, it being understood that the upper part of the receiver or separator is connected to suction-creating means by the connection 42 for that purpose. The air heater $m$ when being used in this manner as a condenser has a cooling medium circulated through the tubes, the said medium passing into and out of the condenser by way of the inlet and outlet connections 35 and 36, it being understood that the steam inlet is then closed and the cock or valve 43 opened so that the vapours pass through outlet 10 round the tubes where they are condensed and the condensate which collects above the tube plate 29 passes into the upper part of the separator or receiver by way of the pipe 43ª. Subsequent to this treatment warm air or alcoholized air is then passed through the still as previously described, for the purpose of recovering the alcohol remaining in the hops and the alcohol rectified if desired for further use. If desired, for the purpose of circulation of the strong alcohol or alcoholic solution through the hops the lower compartment of another receiver 3 may be connected by a pipe 6 to the top of the still. The circulation may be effected by first filling, or substantially filling, the receiver 3 with alcohol through the alcohol inlet 44 the by-pass cock $r^2$ being open. The cock 20 is then opened and suction is created through the pipe 21 at the top of the still so that the alcohol passes into the still through the pipe 6 and percolates through the hops. When all the alcohol has passed into the still from the receiver 3 the by-pass cock $r^2$ is opened and cock 20 closed and the liquor is drawn through pipe 46 into the lower compartment of the receiver by creating suction on the pipe 45 whereby the liquor which has collected in the lower part of the still will be drawn into the lower compartment of the receiver. The liquor may then be recirculated in a similar manner through the hops until it is ascertained that no more of the extractives can be dissolved in this manner. To circulate the alcohol through the hops from the lower compartment of the receiver 3 the cock $r^2$ is then closed and the cock 20 opened whereby the suction at 45 will draw the liquid through the pipe 6 into the top of the still through the hops in the latter and then through the pipe 46 into the upper compartment of the receiver. When the lower compartment is emptied in this manner the cock $r^2$ is opened and the cock 20 closed and the liquid flows by gravity into the lower compartment of the receiver and may again be circulated through the hops as before after having closed cock $r^2$ and opened cock 20, recirculation being carried out until it is ascertained by observation that no more extractive can be dissolved in this manner.

As will be understood by employing the apparatus in this manner the vacuum in the still is not broken when it is desired to recirculate the liquid.

A similar receiver may also be connected to the air heater for use when the latter is being employed as a condenser during reduction of the contents of the still to the desired consistency. When all the alcohol has been removed by the circulation of warm air, as above referred to, water, preferably warm, may be circulated in a similar manner through the hops to that described for circulation of alcohol for the purpose of dissolving out all the remaining resins, tannins etc. soluble in water. When no more extractives can be obtained in this manner steam or warm water is passed through the top and bottom jackets of the dome-shaped covers of the still and the solution reduced down to the required consistency by maintaining the suction. The liquor is then run off.

If desired, the above process may be varied inasmuch as after the hops have been dried by warm air or alcoholized air, and prior to treatment with the strong alcohol, a small quantity of strong alcohol may be run into the still below the false bottom and cold air passed through same and drawn through the hops by suction, whereby the alcoholized air will absorb any moisture still retained in the mass of hops. This is continued until it is ascertained that the hops have been properly dried and the process then proceeds by treatment with strong alcohol as previously described, after the alcohol in the bottom of the still has been removed.

As an alternative to this manner of producing the alcoholized air the lower portion of the still may be provided with means for injecting the alcohol in the form of an atomized mixture of alcohol and air. As illustrated in Figure 1 the means may consist of an alcohol inlet 9 and an inlet 7 for the admission of air under pressure which are connected to a pipe 8 connected to the lower portion of the still. The pipe 8 may have a branch 8a so that the atomized mixture of air and alcohol may be injected into the upper part of the still through the inlet 9a. During the treatment the lower jacket will be cooled so that vapour will be condensed in the bottom of the still. A paddle 47 may be provided carried by the shaft c and which rotates therewith so as to agitate liquid in the bottom of the still and to aid evaporation. If old hops, not containing oil or insufficient oil to give a satisfactory yield, are to be treated, the hops are first dried and then treated with strong alcohol.

Referring now to the modified form of still illustrated in Figure 3, the containing space for the hops consists of a perforated drum 10A mounted for rotation on a horizontal axis in a casing which is provided with top and bottom jacketed covers.

It is to be understood that the apparatus is provided with suitable sight glasses, receivers, thermometers, pressure gauges, safety valves and air cocks.

Further, the invention is not limited to the apparatus described, but such may be varied to suit requirement.

The maintenance of suction during the carrying out of the processes, is important as it avoids overheating during treatment and prevents valuable products from escaping and also from being converted. Further, the hops are agitated throughout the extraction process and in this case the rakes may be rotated at a higher speed than for drying.

An important advantage of the apparatus according to the invention is that in no case is the condensate or liquid containing extract, as the case may be, drawn through the suction pump or other means for creating the pressure below atmosphere, as in every case the liquid collects in a space below the suction connection. I thus avoid contamination of the extracts such as might be produced if the apparatus necessitated the condensate or liquid containing extract passing through the suction creating means.

Having now described my invention, what I claim as new and desire to secure by Letters Patent is:—

1. A process of extracting oils and resins from hops which comprises extracting the oils by subjecting hops to the action of a current of water vapor under a pressure below atmospheric pressure, condensing the vapor and separating the oils from the condensed water; the steps being carried out under vacuum.

2. A process of extracting oils and resins from hops as claimed in claim 1, wherein subsequent to the treatment with water vapor under a pressure below atmospheric pressure, the hops are subjected to the action of a current of warm air which is drawn through the hops to dry, or remove moisture from, the hops.

3. A process of extracting oils and resins from hops as claimed in claim 1, in which the hops are dried and subsequently subjected to the action of strong alcohol 96 per cent or more, to extract soft resins from the hops, and the resins are subsequently separated from the alcohol.

4. A process of extracting oils and resins from hops as claimed in claim 1, in which the hops are dried and subsequently subjected to the action of strong alcohol 96 per cent or more, to extract soft resins from the hops, and the resins are subsequently separated from the alcohol, and the strong alcohol is circulated through the hops.

5. A process of extracting oils and resins from hops as claimed in claim 1, in which the hops are dried and subsequently subjected to the action of strong alcohol 96 per cent or more, to extract soft resins from the hops, and the resins are subsequently separated from the alcohol, and the strong alcohol is circulated and recirculated through the hops.

6. A process of extracting oils and resins from hops as claimed in claim 1, in which the hops are dried and subsequently subjected to the action of strong alcohol 96 per cent or more, to extract soft resins from the hops, and the resins are subsequently separated from the alcohol, and the strong alcohol remaining in the hops is recovered by circulating warm air through the hops and condensing the alcohol therefrom.

7. A process of extracting oils and resins from hops as claimed in claim 1, in which the hops are dried and subsequently subjected to the action of strong alcohol 96 per cent or more, to extract soft resins from the hops, and the resins are subsequently separated from the alcohol, and subsequent to the treatment of the hops with a current of water vapor under a pressure below atmospheric pressure and their further treatment with strong alcohol they are subjected to the action of warm water to extract hard resins and tannin which are subsequently separated from the water.

8. A process of extracting oils and resins from hops as claimed in claim 1, in which the hops are dried and subsequently subjected to the action of strong alcohol 96 per cent or more, to extract soft resins from the hops, and the resins are subsequently separated from the alcohol, and subsequent to the treatment of the hops with a current of water vapor under a pressure below atmospheric pressure and their further treatment with strong alcohol they are subjected to the action of warm water to extract hard resins and tannin which are subsequently separated from the water, and the warm water is circulated through the hops.

9. Apparatus for extracting oils and resins comprising in combination a still, having spaced apart perforated partitions providing an intermediate space to confine the hops, agitating means in said space, a condenser connected to the outlet of the still, a separator connected to the outlet of the condenser, to receive liquid or condensate therefrom, and means whereby suction may be created in the separator so as to produce sub-atmospheric pressure in the condenser and still; said separator comprising a vessel divided into upper and lower compartments, a vertical partition dividing the lower compartment into two portions connected at their upper ends, a pipe or by-pass connecting the lower part of the upper compartment to the lower part of one of the portions of the lower compartment, and means whereby suction can be created in the upper compartment substantially as and for the purpose described.

10. Apparatus for carrying out the process of extracting oils and resins from hops comprising a still, a receiver connected to the outlet of the still to receive liquid or condensate, and means whereby suction may be created in the receiver or separator so as to produce subatmospheric pressure in the still, said receiver comprising a vessel divided into upper and lower compartments, a vertical partition dividing the lower compartment into two portions connected at their upper ends, a pipe or by-pass connecting the lower part of the upper compartment to the lower part of one of the portions of the lower compartment, and means whereby suction can be created in the upper compartment substantially as and for the purposes described.

In testimony whereof, I have signed my name to this specification.

LOUIS WEBER.